US011944073B1

(12) United States Patent
Lan et al.

(10) Patent No.: US 11,944,073 B1
(45) Date of Patent: Apr. 2, 2024

(54) HEAT PRESERVATION LAMP FOR BREEDING

(71) Applicant: Shenzhen Guanke Technologies Co., Ltd, Shenzhen (CN)

(72) Inventors: Qing Lan, Shenzhen (CN); Ligen Liu, Shenzhen (CN); Hongwei Yu, Shenzhen (CN); Qinwan Gong, Shenzhen (CN)

(73) Assignee: Shenzhen Guanke Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/295,490

(22) Filed: Apr. 4, 2023

(30) Foreign Application Priority Data

Dec. 9, 2022 (CN) .......................... 202223315155.3

(51) Int. Cl.
*A01K 31/20* (2006.01)
*F21S 8/06* (2006.01)
*F21V 15/02* (2006.01)
*F21V 31/00* (2006.01)
*F26B 23/04* (2006.01)

(52) U.S. Cl.
CPC ................ *A01K 31/20* (2013.01); *F21S 8/06* (2013.01); *F21V 15/02* (2013.01); *F21V 31/005* (2013.01); *F26B 23/04* (2013.01)

(58) Field of Classification Search
CPC ...... A01K 31/20; A01K 41/02; A01K 41/023; F21S 8/06; F21L 15/02; F21L 31/005; F21L 31/00; F26B 23/04
USPC ...................................................... 362/158, 92
See application file for complete search history.

(56) References Cited

U.S. PATENT DOCUMENTS 10,865,977 B1 * 12/2020 Lan .......................... F21V 29/67

* cited by examiner

*Primary Examiner* — Laura K Tso
(74) *Attorney, Agent, or Firm* — Maier & Maier, PLLC (57) ABSTRACT

A heat preservation lamp for breeding, including at least one mounting part, at least one light source, at least one lampshade and at least one waterproof structure. The light source includes at least one electrical connection portion, at least one fitting portion and at least one illumination portion connected in sequence, where one end of the electrical connection portion is connected to the mounting part, and the cross section of the fitting portion is arranged in an increasing manner from the end connected to the connection part to the end connected to the illumination portion; the lampshade is connected to the mounting part, and the lampshade is of an annular structure and surrounds the light source; the waterproof structure is between the fitting portion and the lampshade. The embodiments can improve the waterproof performance and ensure the service life of the heat preservation lamp.

16 Claims, 7 Drawing Sheets

HEAT PRESERVATION LAMP FOR BREEDING

TECHNICAL FIELD

The present disclosure relates to the technical field of lamps, and in particular to a heat preservation lamp for breeding.

BACKGROUND

In order to achieve the provision of heat and illumination of the poultry being bred, the breeding personnel will be provided with a heat preservation lamp for breeding at the breeding site. The heat preservation lamp for breeding in the related art generally comprises a light source and a lampshade sheathed on the light source, so that the light source is protected by the lampshade. However, since both the light source and the lampshade opening face downward, a gap is formed therebetween. If a water droplet is splashed upward on the ground in this way, the splashed water droplet enters from the gap between the light source and the lampshade, contacts the electrical connection portion of the light source (e.g. the lamp cap of the bulb), and may cause a short circuit to occur, thereby affecting the service life of the heat preservation lamp for breeding.

SUMMARY

The main object of the present disclosure is to provide a heat preservation lamp for breeding, aiming at improving the waterproof performance of the heat preservation lamp for breeding, so as to ensure the service life of the heat preservation lamp for breeding.

In order to achieve the above-mentioned object, the heat preservation lamp for breeding proposed by the present disclosure comprises:

- at least one mounting part;
- at least one light source, wherein the light source comprises at least one electrical connection portion, at least one fitting portion and at least one illumination portion which are connected in sequence, the electrical connection portion is connected to the mounting part, and the cross section of the fitting portion decreases from the end connected to the electrical connection portion to the end connected to the illumination portion;
- at least one lampshade, wherein the lampshade is connected to the mounting part, and the lampshade is of an annular structure and surrounds the outside of the light source; and
- at least one waterproof structure, wherein the waterproof structure provided between the fitting portion and the lampshade.

Other features and corresponding advantages of the present application are set forth in a later portion of the specification.

The technical problem solving idea and the relevant product design scheme of the present application are: the light source is given to mounting position by the mounting part, while the lampshade is provided on the mounting part, and the lampshade is provided to surround the outside of the light source. At this time, the light source can be protected by the lampshade, and drops of water on the outside and above side of the lampshade can be reduced to fall onto the light source, so that the light source can be protected from water.

In addition, the present application also innovatively provides at least one waterproof structure between the fitting portion of the light source and the lampshade. At this time, when the electrical connection portion of the light source is placed in the installation position, the waterproof structure and the fitting portion of the light source are closely fitted, and if a water droplet is splashed upwards on the ground, it can be blocked by the fit between the waterproof structure and the fitting portion, so as to prevent the splashed water droplet from continuously splashing to the electrical connection portion contacting the light source to cause a short circuit, resulting in the damage of the heat preservation lamp for breeding. Therefore, by means of a protective structure constituted by the lampshade, and the waterproof protective structure constituted by the waterproof structure and the fitting portion, the heat preservation lamp for breeding of the present application has achieved a waterproof effect on both the outside and above and below the heat preservation lamp for breeding, which greatly improves the waterproof performance of the heat preservation lamp for breeding, and can better avoid the possibility that the heat preservation lamp for breeding is damaged due to contact with water droplets, so as to facilitate ensuring the service life of the heat preservation lamp for breeding.

The shape, size, proportion or positional relationship of the component parts of the product shown in the drawings can be actual data of the embodiments and fall within the scope of protection of the present application.

DETAILED DESCRIPTION

In order that the objects, aspects and advantages of the present application will become more apparent, a more particular description of embodiments of the present application will be rendered by reference to the appended drawings. It should be understood that the particular embodiments described herein are illustrative only and are not restrictive.

With reference to FIGS. 1 to 7, the present disclosure proposes A heat preservation lamp for breeding 100. In one embodiment of the present disclosure, the heat preservation lamp for breeding 100 comprises at least one mounting part 1, at least one light source 2, at least one lampshade 3 and at least one waterproof structure 4. The light source 2 comprises at least one electrical connection portion 21, at least one fitting portion 22 and at least one illumination portion 23 which are connected in sequence, wherein one end of the electrical connection portion 21 is connected to the mounting part 1, and the cross section of the fitting portion 22 decreases from the end connected to the electrical connection portion 21 to the end connected to the illumination portion 23; the lampshade 3 is connected to the mounting part 1, and the lampshade 3 is of an annular structure and surrounds the outside of the light source 2; the waterproof structure 4 is provided between one end of the illumination portion 23 close to the electrical connection portion 21 and the lampshade 3.

The mounting part 1 described above may be used to provide at least one mounting location for mounting the light source 2 on the mounting part 1. The projection of the mounting part 1 on a horizontal plane can be circular or square, and the specific shape of the mounting part 1 is not limited in the present application. The light source 2 may be used to provide heat and illumination, and may be composed of the electrical connection portion 21 at upper end, the illumination portion 23 at lower end, and the fitting portion 22 connecting the electrical connection portion 21 and the illumination portion 23. The light source 2 can be electrically connected to an external power source directly or indirectly via an electrical connection portion 21 so as to introduce electric energy. The light source 2 can be used to provide heat and light emission through the illumination portion 23, thereby providing heat and illumination to the outside of the light source 2. The fitting portion 22 is provided with a tapered cross-section from one end near the electrical connection portion 21 to one end near the illumination portion 23, so that the light source 2 can preferably transition from the electrical connection portion 21 with a relatively small cross-section to the illumination portion 23 with a relatively large cross-section. Further, the electrical connection portion 21 may be made of electrically conductive material, such as various metals or other materials. In addition, the shape of the electrical connection portion 21 can be a column structure, a plate structure or other structures, etc. and the present application does not specifically define the shape and structure of the electrical connection portion 21, and can perform a conductive connection. The structural form of the illumination portion 23 can be a bulb, and of course can also be a lamp tube, and this is not particularly limited in the present application. The lampshade 3 may be used to surround the outside of the light source 2 to protect the light source 2 from foreign objects while preventing water droplets on the outside of the lampshade 3 from falling onto the light source 2. Here, the lampshade 3 may have a trumpet-like structure so as to include the light source 2 with a larger illumination viewing angle. Of course, the lampshade 3 may have a straight cylindrical structure, and the present application does not define the specific shape of the lampshade 3. The material of the lampshade 3 may be metal, so as to improve the strength of the lampshade 3. Of course, the material of the lampshade 3 can also be plastic, so that the weight of the lampshade 3 is relatively light, and the material of the lampshade 3 is not specifically defined in the present application. The waterproof structure 4 may be used to waterproof between the light source 2 and the lampshade 3 to prevent water droplets splashed upward on the ground from entering from the gap between the two to contact the electrical connection portion 21.

With reference to FIGS. 3 to 7, in one embodiment of the present present disclosure, the waterproof structure 4 comprises at least one annular waterproof piece 43, wherein the waterproof piece 43 is sheathed on the outer side of the fitting portion 22, and when the electrical connection portion 21 penetrates towards the waterproof piece 43 and moves towards the mounting part 1, the waterproof piece 43 is arranged to abut against the fitting portion 22.

In the present embodiment, the waterproof structure 4 includes the waterproof piece 43 provided in a ring-shaped structure, so that the circumferential side of the fitting portion 22 of the light source 2 can be provided with abutting sealing effect with the ring-shaped waterproof piece 43, thereby contributing to improving the watertight effect of the waterproof structure 4. In other words, at least the inner surface of the waterproof piece 43 is made of soft material, and when the electrical connection portion 21 of the light source 2 penetrates into the waterproof piece 43 and moves toward the mounting part 1, it can also be the that when the light source 2 is mounted on the mounting part 1 from bottom to top, the side surface of the light source 2 can give a pressing force to the inner surface of the waterproof piece 43, so that the waterproof piece 43 can abut against the fitting portion 22 of the light source 2 after the installation of the light source 2 is completed, thereby completing sealing and waterproofing. Wherein the diameter of the minimum opening of the waterproof piece 43 can be adapted to the diameter of the fitting portion 22 of the light source 2 at certain position, and the certain position is just a position in which the minimum opening of the waterproof piece 43 fits and abuts when the light source 2 is mounted on the mounting part 1. Further, it should be noted that the waterproof piece 43 may be movably provided between the fitting portion 22 and the lampshade 3. That is, the waterproof piece 43 can move up and down, and is held by the support plate 41 and the elastic member 45 as described below. Of course, the waterproof piece 43 may be configured to be fixedly connected to the lampshade 3.

In one embodiment of the present disclosure, the lampshade 3 comprises at least one main body cover 31 and at least one connecting flange 33, wherein the main body cover 31 has an annular structure with openings at two ends and surrounds the outside of the light source 2; the connecting flange 33 is connected to the opening of one end of the main body cover 31 and extends towards the inner side of the main body cover 31, and the connecting flange 33 is connected to the mounting part 1; the waterproof structure 4 further comprises at least one support plate 41, which is provided on the inner side of the main body cover 31 and cooperates with the connecting flange 33 to clamp and fix the waterproof piece 43.

In this embodiment, the lampshade 3 preferably protects the light source 2 by means of the ring-shaped main body cover 31, and preferably abuts against and is conveniently connected to the mounting part 1 by means of the connecting flange 33, thereby facilitating easy mounting of the lampshade 3. Among other things, the connecting flange 33 may be circumferentially disposed around the main body cover 31 to increase the area of the connecting flange 33 to facilitate improved stability of the connection between the lampshade 3 and the mounting part 1. Of course, the present application is not limited to this, and in other embodiments, the connecting flanges 33 may be provided as a plurality of plate structures arranged at intervals in the circumferential direction of the main body cover 31. By means of the support plate 41, the waterproof structure 4 can then give the waterproof piece 43 an installation position for installing the waterproof piece 43. That is, the support plate 41 can cooperate with the connecting flange 33 to clamp and limit the installation of the waterproof piece 43. At this time, it is not necessary to provide the waterproof piece 43 with a connection structure for connecting the waterproof piece 43, so that it is advantageous to ensure that the structure of the waterproof piece 43 itself is not affected by the connection structure, and the waterproofing function is good. Among other things, the support plate 41 may also be arranged in annular configuration around the circumference of the light source 2 like the waterproof piece 43, so that the support plate 41 may have a larger area to facilitate an increased stability of the installation of the waterproof piece 43. Further, it should be noted that the present application is not limited thereto, and in some embodiments, the lampshade 3 may include only the main body cover 31. The waterproof structure 4 may include only the waterproof piece 43, and the waterproof piece 43 may be directly connected to the lampshade 3. For example: it can be fixed by threading screws or by gluing, etc.

With reference to FIGS. 3 to 7 in combination, in one embodiment of the present disclosure, the waterproof piece 43 comprises at least one main body ring 431 and at least one limiting ring 433, wherein the main body ring 431 is of an annular structure with openings at two ends, and the channel cross section of the main body ring 431 is provided in an increasing manner in the direction in which the electrical connection portion 21 points towards the illumination portion 23, and the main body ring 431 surrounds and abuts on the outer side of the fitting portion 22; the limiting ring 433 is connected to an opening of one end of the main body ring 431 away from the electrical connection portion 21 and extends toward the outside of the main body ring 431, and is clamped between the support plate 41 and the connecting flange 33.

In the present embodiment, the waterproof piece 43 can be sheathed outside the fitting portion 22 of the light source 2 by the main body ring 431, and the diameter of the upper end of the main body ring 431 is relatively small because the passage cross-section of the main body ring 431 is set incrementally in the downward-upward direction. At this time, when the light source 2 is inserted and mounted from the bottom to the top, the lower end of the main body ring 431 can easily pass through the light source 2, and is adhered to the side peripheral surface of the light source 2 only by the upper end. This makes it possible to waterproof the light source 2 by means of the main body ring 431 without scratching the surface of the light source 2 due to an excessive contact area. The positioning of the limiting ring 433 makes it convenient for the waterproof piece 43 to abut against the support plate 41, so that the connecting flange 33 of the support plate 41 and the lampshade 3 clamp and limit the installation of the waterproof piece 43. Here, the limiting ring 433 may be circumferentially provided around the main body ring 431 to further increase the contact area between the waterproof piece 43 and the support plate 41, thereby further improving the stability of installation of the waterproof piece 43. Note that the present application is not limited to this, and in other embodiments, the waterproof piece 43 may include only the main body ring 431, in which case the lower end of the main body ring 431 may be directly fixed to the main body cover 31 of the lampshade 3 by means of screws or glue bonding. Of course, it is also possible for the waterproof piece 43 to have a flat annular configuration, the outer periphery of which can be clamped between the support plate 41 and the connecting flange 33.

Figure 4:
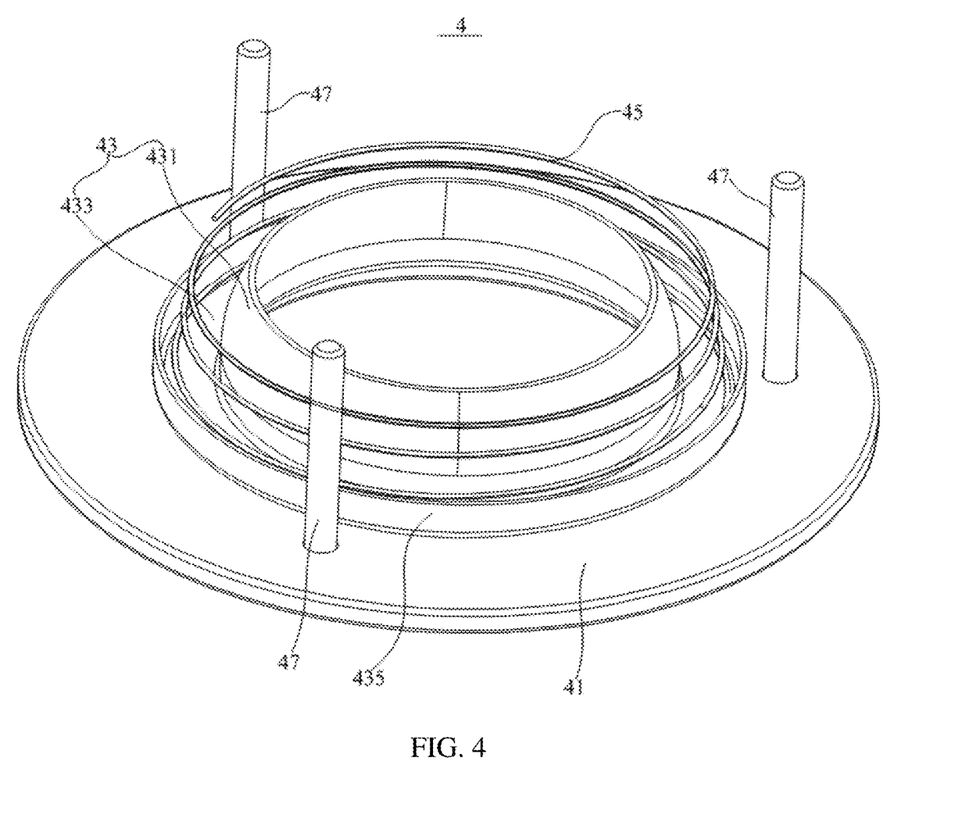
FIG. 4 is a schematic view showing a waterproof structure of the heat preservation lamp for breeding of FIG. 3.
Figure 5:
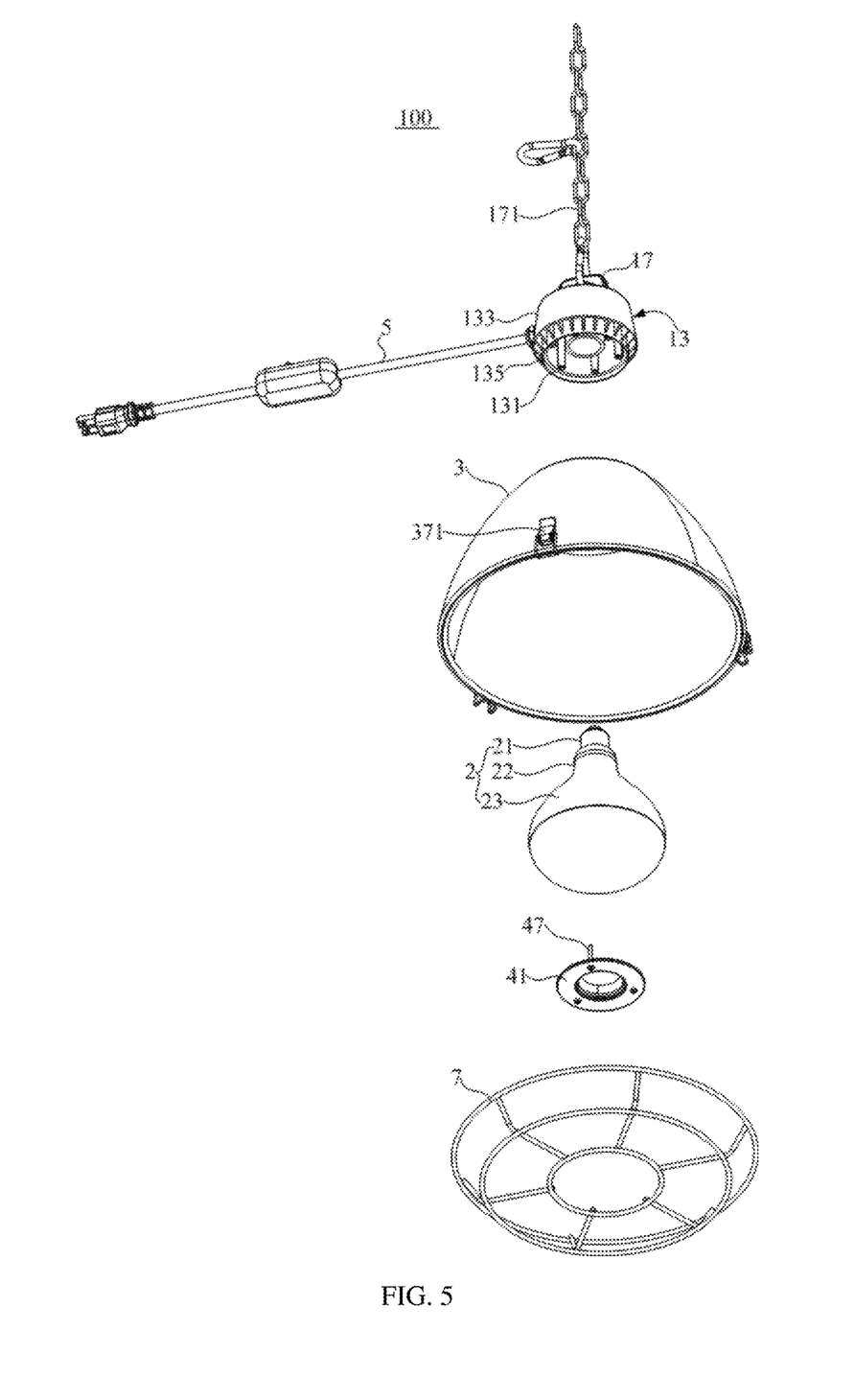
FIG. 5 is a schematic view showing another perspective of the explosion structure of the heat preservation lamp for breeding of FIG. 3.
Figure 6:
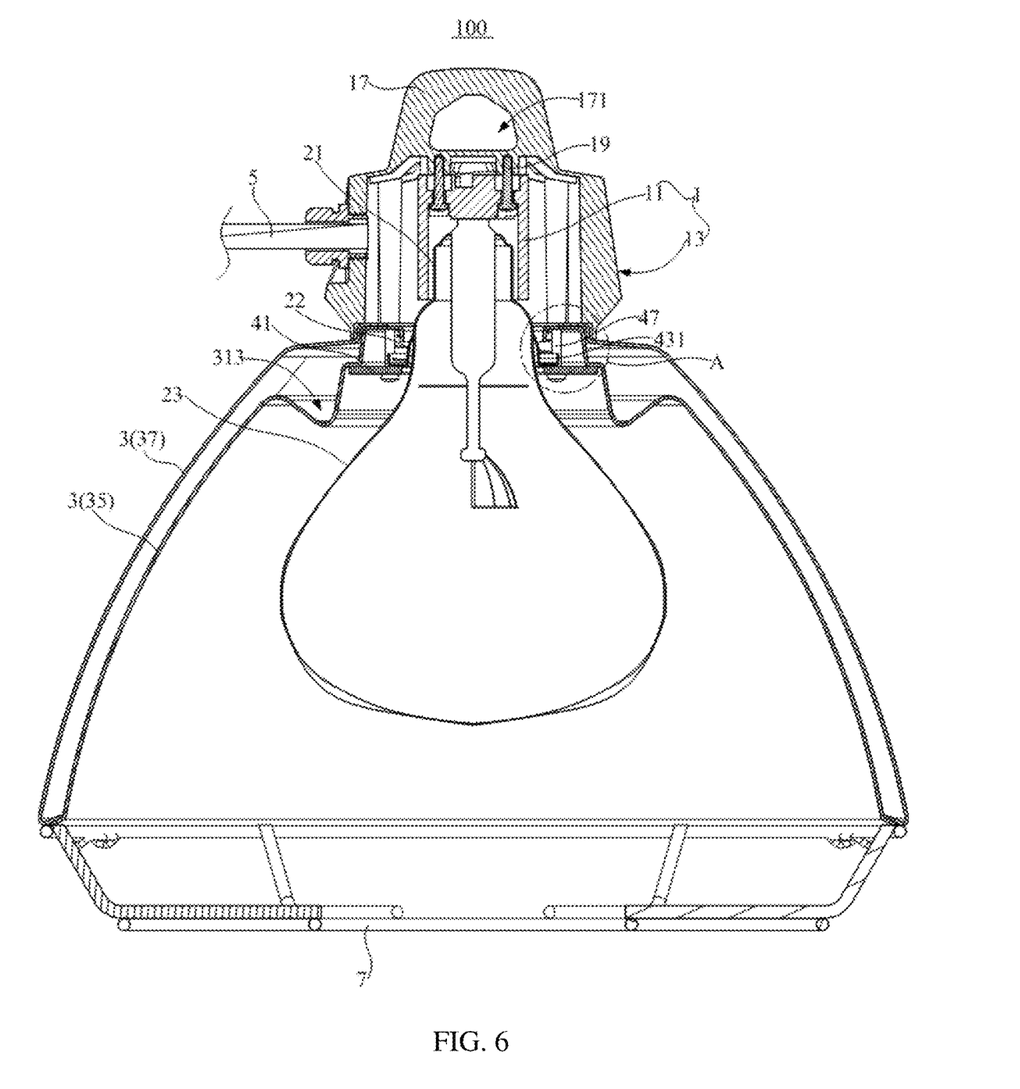
FIG. 6 is a schematic cross-sectional view of the aquaheat preservation lamp for breeding of the present disclosure.
Figure 7:
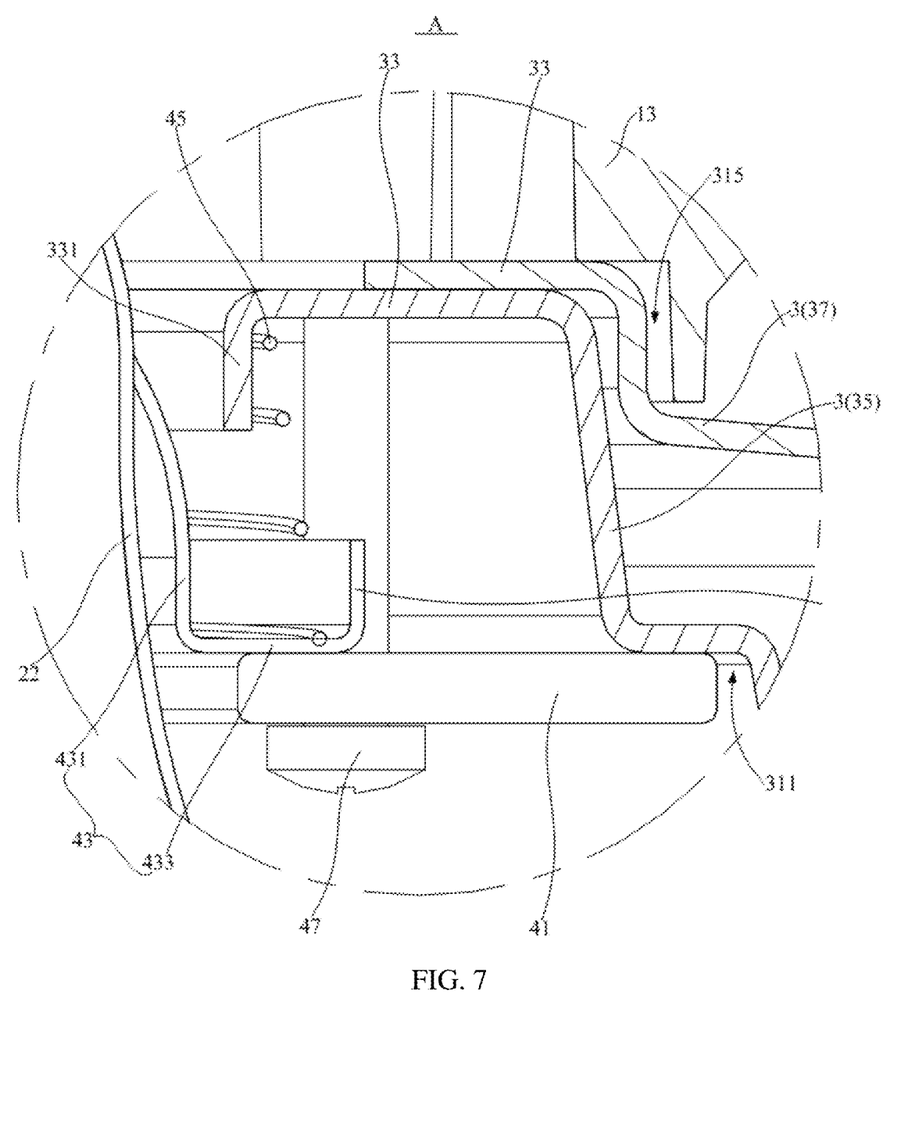
FIG. 7 is a partial schematic view at A in FIG. 6.

With reference to FIGS. 4, 6 and 7 in combination, in one embodiment of the present disclosure, when the waterproof piece 43 is movably arranged between the fitting portion 22 and the lampshade 3, the waterproof structure 4 further comprises at least one elastic member 45, wherein the elastic member 45 is sheathed on the outer side of the main body ring 431, and the opposite ends of the elastic member 45 are respectively elastically abutted against the connection connecting flange 33 and the limiting ring 433, so that the connection connecting flange 33 clamps and limits the connection connecting flange 33 by means of the elastic member 45 cooperating with the support plate 41.

In this embodiment, the elastic member 45 is provided so that the waterproof piece 43 has a certain movement space in the up-and-down direction. At this time, when the light source 2 is mounted on the mounting part 1 in the downward-upward direction, since the diameter of the upper end of the main body ring 431 of the waterproof piece 43 is relatively small, the waterproof piece 43 can be moved upward by friction during the upward mounting of the light source 2. The waterproof piece 43 is elastically abutted by the elastic member 45, so that the upward moving waterproof piece 43 can press the elastic member 45 to elastically deform, and after the elastic deformation, the elastic member 45 can generate a downward deforming elastic force, and the downward deforming elastic force can drive the waterproof piece 43 to have a downward moving drive, so that the waterproof piece 43 abuts against the fitting portion 22 of the light source 2. Therefore, the waterproof piece 43 can be urged against the side peripheral surface of the light source 2 by the elastic member 45, thereby contributing to the improvement of the waterproofing effect of the waterproof piece 43.

Furthermore, referring to FIGS. 4, 6 and 7 in combination, the elastic member 45 is spring, the inner side of the connecting flange 33 is provided with at least one first enclosure plate 331, the first enclosure plate 331 is circumferentially arranged along the opening of the lampshade 3, and extends in a direction towards the support plate 41 and is inserted into the opening of one end of the spring; the outer side of the limiting ring 433 is provided with at least one second enclosure plate 436, the second enclosure plate 436 is circumferentially arranged along the opening of the main body ring 431 and extends in a direction towards the connecting flange 33, and the first enclosure plate 331 and the second enclosure plate 436 respectively abut the inner side and the outer side of the spring.

In the present embodiment, the elastic member 45 is provided as a spring so that the elastic member 45 can have a better elastic force to better urge the waterproof piece 43 against the side peripheral surface of the light source 2. At the same time, the cost of the elastic member 45 is relatively low and readily available. Of course, the present application is not limited thereto, and in other embodiments, the elastic member 45 may be an elastic plastic member. Furthermore, the arrangement of the first enclosure plate 331 and the second enclosure plate 436 can play a limiting and abutting function on the spring, so as to ensure that the spring can stably be in a pre-set installation position.

Further, referring to FIG. 4, FIG. 6, and FIG. 7 in combination, the waterproof structure 4 further includes at least one first fastening screw 47, which passes through the support plate 41 and the connecting flange 33 in turn, and is inserted into the mounting part 1 to fix the support plate 41 and the lampshade 3 to the mounting part 1. At this time, the support plate 41 and the lampshade 3 are fixed by the first fastener screw, so that the convenience of mounting the support plate 41 and the lampshade 3 can be improved. At the same time, the support plate 41, the waterproof piece 43, the elastic member 45, and the lampshade 3, etc. are also made detachable to improve the convenience of maintenance and replacement of the partial structure. However, in order to further improve the convenience and stability of mounting the support plate 41, the first step portion 311 is formed on the inner side of the main body cover 31, the first step portion 311 is circumferentially provided along the circumferential direction of the main body cover 31, the outer peripheral edge of the support plate 41 is accommodated in the first step portion 311, and the side of the support plate 41 facing the connecting flange 33 abuts the step surface of the first step portion 311. At this time, the first step portion 311 functions as the attachment positioning and the abutment limit for the support plate 41.

In an embodiment of the present invention, the waterproof piece 43 is configured such that at least one inner surface thereof is sprayed with a heat resistant soft layer.

In the present embodiment, the heat resistant soft layer is coated on the waterproof piece 43, so that the frictional force between the waterproof piece 43 and the light source 2 can be increased to further increase the degree to which both are tightly waterproofed. The heat resistant soft layer is preferably a high-temperature glue, which, due to the fact that it forms a flexible object after curing, also better prevents scratching of the surface of the light source 2. In addition, the high-temperature glue also has a high-temperature resistance during curing, which is advantageous for ensuring that the waterproof piece 43 is not easily damaged by the heat generated by the light source 2. Here, only the inner surface of the waterproof piece 43 may be coated with at least one heat resistant soft layer. Of course, it is also possible to further coat the outer surface of the waterproof piece 43 with a heat resistant soft layer. In addition, the sealing waterproof piece 43 may be made of aluminum so as to be deformed closely to the side peripheral surface of the light source 2, and may have a certain strength so as to have a certain service life.

Referring to FIG. 6, in one embodiment of the present disclosure, the main body cover 31 is formed with at least one concave depression area 313 below the support plate 41, and the passage cross-sectional area of the portion of the main body cover 31 above the depression area 313 is arranged in a descending manner in the direction from bottom to top.

In this embodiment, the portion of the main body cover 31 located above the depression area 313 can be brought closer to the light source 2 by the arrangement of the depression area 313. In addition, the passage cross-sectional area of the portion of the main body cover 31 located above the depression area 313 is arranged in a decreasing manner, so that the main body cover 31 can be further brought close to the light source 2, so that the waterproof structure 4 with relatively compact structure is arranged between the upper end of the lampshade 3 and the light source 2. At the same time, since the depression area 313 is concavely arranged, the water droplets splashed below the lamp can also be shielded by the concave depression area 313, so as to further improve the overall waterproof performance of the heat preservation lamp for breeding 100.

With reference to FIGS. 6 and 7, in one embodiment of the present present disclosure, the number of lampshades 3 is two, the two lampshades 3 are arranged in a nested manner, and one of the two lampshades 3 is defined as an inner lampshade 35, and the other of the two lampshades 3 is defined as an outer lampshade 37, wherein a gap is formed between an inner side surface of the outer lampshade 37 and an outer side surface of the inner lampshade 35.

In one embodiment of the present disclosure, since a gap is provided between the inner lampshade 35 and the outer lampshade 37, the heat generated by the inner light source 2 is not easily transferred to the outer lampshade 37, so as to prevent the outer lampshade 37 from causing scald to human body or poultry due to excessive temperature. Wherein the structures of the inner lampshade 35 and the outer lampshade 37 can be identical (namely, the structures of the inner lampshade 35 and the outer lampshade 37 are identical everywhere, and a double-layer structure is sufficient); may also be different (namely, one may be a straight tube structure, and the other may be a horn-shaped structure); can of course also be partially identical (for example: the inner lampshade 35 and the outer lampshade 37 both comprise the main body cover 31 and the connecting flange 33, and at least one first fastening screw 47 passes through the connecting flange 33 of the inner lampshade 35 and the outer lampshade 37 to fix the two lampshades 3 on the mounting part 1), while the other part is different (for example: the first enclosure plate 331, the depression area 313, and the first step portion 311 may be provided only on the inner lampshade 35, and the second step portionped portion 315 may be provided only on the outer lampshade 37).

With reference to FIG. 6, in one embodiment of the present disclosure, the mounting part 1 comprises at least one lamp holder 11 and at least one outer housing 13, and one end of the electrical connection portion 21 remote from the illumination portion 23 is electrically connected to the lamp holder 11; the outer housing 13 has a cylindrical structure with an opening at one end, and is arranged outside the lamp holder 11, and the lampshade 3 is connected to the outer housing 13.

In this embodiment, the light source 2 is preferably given mounting position by means of the lamp holder 11, so that the light source 2 is electrically connected at the mounting part 1. The outer housing 13 can further protect the lamp holder 11 and the light source 2 so as to block the falling water drops at the top of the heat preservation lamp for breeding 100 and improve the water-proof performance of the heat preservation lamp for breeding 100 again. Here, the first fastening screw 47 may be inserted into the outer housing 13 after passing through the support plate 41 and the lampshade 3. Further, it should be noted that the present application is not limited to this, and in other embodiments, the mounting part 1 may include only the lamp holder 11.

Figure 3:
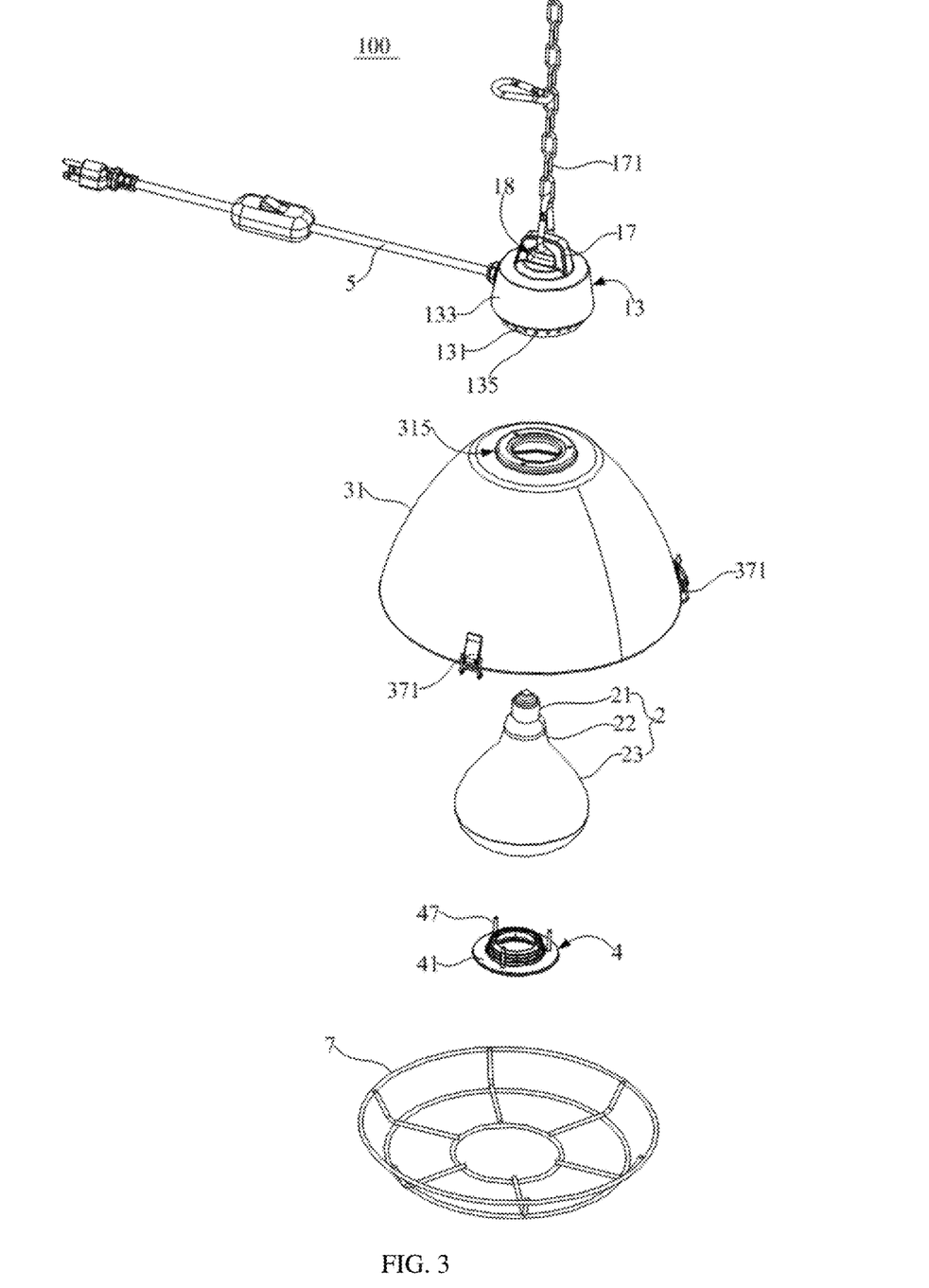
FIG. 3 is a schematic view showing an explosion structure of the heat preservation lamp for breeding of FIG. 1.

Further, referring to FIGS. 3, 6 and 7 in combination, the outer side of the lampshade 3 near one end of the outer housing 13 is formed with at least one second step portion 315, and the second step portion 315 is circumferentially arranged around the lampshade 3. An end of the outer housing 13 having an opening is inserted into the second step portionped portion 315, and the inner side surface of the outer housing 13 abuts the stepped surface of the second step portionped portion 315. At this time, by sleeving the second step portionped portion 315 of the outer housing 13 at the upper end of the lampshade 3, it is possible to prevent water droplets from entering the heat preservation lamp for breeding 100 at the junction of the outer housing 13 and the lampshade 3, thereby further improving the waterproof performance of the heat preservation lamp for breeding 100.

Figure 1:
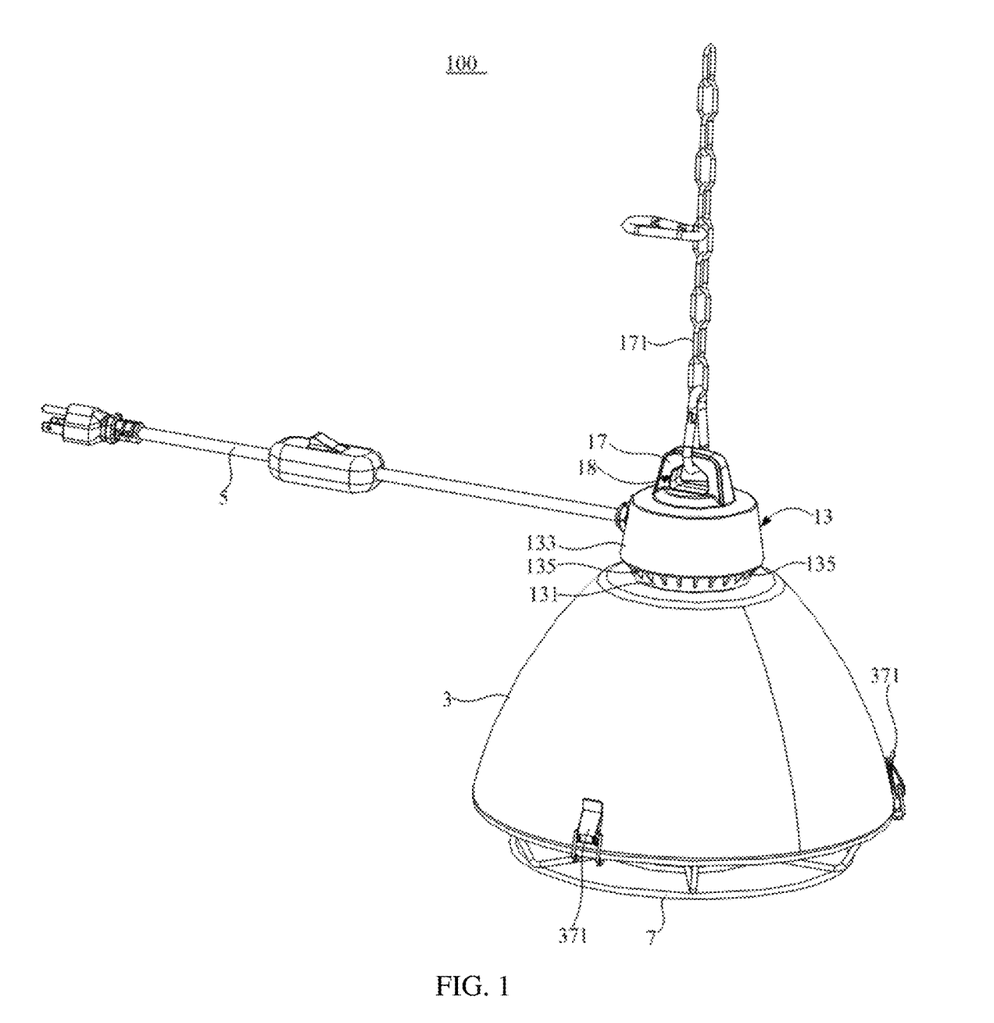
FIG. 1 is a schematic structural view of one embodiment of the present disclosure heat preservation lamp for breeding.
Figure 2:
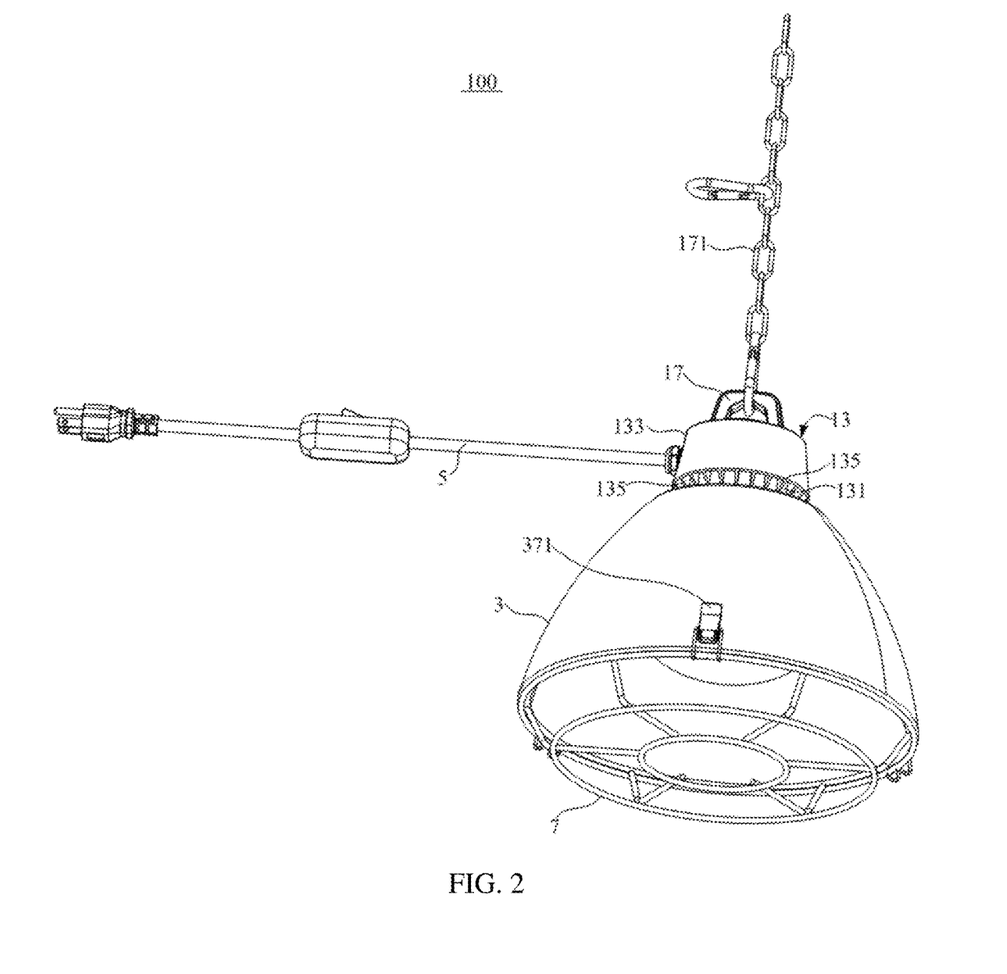
FIG. 2 is a schematic view showing another perspective of the heat preservation lamp for breeding of FIG. 1.

In one embodiment of the present disclosure, the material of the outer housing 13 can be aluminium. With reference to FIGS. 1 and 2, the side wall of the outer housing 13 comprises at least one inner side plate 131 and at least one outer side plate 133, wherein the inner side plate 131 and the outer side plate 133 are arranged at intervals and are connected to a plurality of radiating fins 135, and the plurality of radiating fins 135 are arranged at intervals along the circumferential direction of the outer housing 13.

In the present embodiment, the material of the outer housing 13 is set to be aluminum, so that the outer housing 13 can have a good thermal conductivity, and thus can have a heat dissipation effect on the light source 2. In addition, the side wall of the outer housing 13 comprises at least one inner side plate 131 and at least one outer side plate 133, and at least one radiating fin 135 is provided therebetween, so that the heat dissipation area of the outer housing 13 and the outside air can be increased to further improve the heat dissipation effect of the outer housing 13. Of course, it should be noted that the present application is not limited to this, and in other embodiments, the material of the outer housing 13 may be plastic or another material.

With reference to FIGS. 1 and 6, in one embodiment of the present present disclosure, the mounting part 1 further comprises at least one hanging rod 17, wherein the hanging rod 17 is connected to one side of the outer housing 13 facing away from the opening thereof, and encloses with the outer housing 13 to form at least one hanging groove 18, and the hanging groove 18 is used for connecting to at least one hanging piece 171 for mounting the heat preservation lamp for breeding 100 in alignment; the mounting part 1 further comprises at least one second fastening screw 19, wherein the second fastening screw 19 successively passes through the lamp holder 11 and the outer housing 13, and is inserted into the hanging rod 17 so as to fix the lamp holder 11 to the outer housing 13;

In the present embodiment, the hanging rod 17 and the outer housing 13 are enclosed to form at least one hanging groove 18, so that the hanging piece 171 can be conveniently connected to the hanging groove 18, thereby achieving the external installation of the heat preservation lamp for breeding 100. The hanging piece 171 may specifically be a chain or a rope, etc. and is connected with a mountaineering buckle which is engaged with the hanging groove 18. Further, the lamp holder 11 is fixed to the outer housing 13 by the second fastening screw 19, so that the convenience of mounting thereof can be improved. At the same time, the lamp holder 11 is also made removable to improve the ease of repair and replacement of the part of the structure. Furthermore, the second fastening screw 19 is also inserted into the hanging rod 17, thereby ensuring that the thickness of the top wall of the outer housing 13 can be set relatively thin. In addition, the heat preservation lamp for breeding 100 may further comprise at least one power line 5, one end of which passes through the outer housing 13 and is electrically connected to the lamp holder 11, so as to facilitate the electrical connection between the heat preservation lamp for breeding 100 and an external power supply.

With reference to FIGS. 1 to 3, in one embodiment of the present present disclosure, the heat preservation lamp for breeding 100 further comprises at least one protective cover 7, wherein the protective cover 7 is a net structure and covers an opening at one end of the lampshade 3 away from the mounting part 1, and the protective cover 7 and the lampshade 3 are detachably connected.

In this embodiment, the light source 2 can be further protected from being isolated by providing the protective cover 7 at the bottom of the lamp housing 3. The protective cover 7 is also detachably connected, so that it can be easily repaired and replaced. In order to improve the ease of removal of the protective cover 7, the outer side of the lampshade 3 at the end remote from the mounting part 1 may be provided with at least one buckle 371, and the protective cover 7 is detachably connected to the lampshade 3 by the buckle 371. At this time, the quick installation and removal of the protective cover 7 can be realized by simply rotating the unlocking part of the buckle 371.

The above-mentioned description is merely a preferred embodiment of the present disclosure, and does not limit the scope of the patent of the present disclosure. Any equivalent structural transformation made by using the contents of the description and the drawings of the present disclosure under the inventive concept of the present present disclosure, or direct/indirect application in other relevant technical fields, is included in the scope of the patent protection of the present disclosure.

What is claimed is:

1. A heat preservation lamp for breeding, comprising:
   at least one mounting part;
   at least one light source, wherein the light source comprises at least one electrical connection portion, at least one fitting portion and at least one illumination portion which are connected in sequence, the electrical connection portion is connected to the mounting part, and the cross section of the fitting portion increases from the end connected to the electrical connection portion to the end connected to the illumination portion;
   at least one lampshade, wherein the lampshade is connected to the mounting part, and the lampshade is of an annular structure and surrounds the outside of the light source; and
   at least one waterproof structure, wherein the waterproof structure provided between the fitting portion and the lampshade.

2. The heat preservation lamp for breeding as in claim 1, wherein that the waterproof structure comprises at least one annular waterproof piece from a group consisting of a waterproof piece which is sheathed outside the fitting portion, a waterproof piece which is movably arranged between the fitting portion and the lampshade, and a waterproof piece which is configured to be fixedly connected to the lampshade; and
   when the electrical connection portion penetrates toward the waterproof piece and moves toward the mounting part, the waterproof piece is arranged to abut against the fitting portion.

3. The heat preservation lamp for breeding as in claim 2, wherein the lampshade comprises at least one main body cover and at least one connecting flange, wherein the main body cover has an annular structure with openings at two ends and surrounds the outside of the light source; the connecting flange is connected to the opening at one end of the main body cover and extends toward the inside of the main body cover, and the connecting flange is connected to the mounting part; and
   the waterproof structure further comprises at least one support plate, wherein the support plate is provided on the inner side of the main body cover and cooperates with the connecting flange to clamp the waterproof piece.

4. The heat preservation lamp for breeding as in claim 3, wherein the waterproof piece comprises:
   at least one main body ring, wherein the main body ring has an annular structure with openings at two ends, and a channel in the cross section of the main body ring is provided in increasing manner in the direction in which the electrical connection portion points towards the illumination portion, and the main body ring surrounds the outside of the fitting portion; and
   at least one limiting ring, wherein the limiting ring is connected to the opening of one end of the main body ring away from the electrical connection portion and extends towards the outside of the main body ring, and the limiting ring is clamped and limited between the support plate and the connecting flange.

5. The heat preservation lamp for breeding as in claim 4, wherein that when the waterproof piece is movably arranged between the fitting portion and the lampshade, the waterproof structure further comprises:
- at least one elastic member, wherein the elastic member is sheathed outside the main body ring, and two opposite ends of the elastic member are respectively elastically abutted against the connecting flange and the limiting ring, so that the connecting flange is clamped and limited by the elastic member cooperating with the support plate; and
- at least one fastening screw, wherein the first fastening screw passes through the support plate and the connecting flange in this order and is inserted into the mount so that the support plate is fixed to the inside of the main body cover.

6. The heat preservation lamp for breeding as in claim 5, wherein the elastic member is a spring, at least one first enclosure plate is provided on the inner side of the connecting flange, the first enclosure plate is circumferentially arranged along the opening of the lampshade and extends in a direction towards the support plate and is inserted into the opening of one end of the spring.

7. The heat preservation lamp for breeding as in claim 3, wherein the first step portion is formed on the inner side of the main body cover, the first step portion is circumferentially arranged along the circumference of the main body cover, the outer peripheral edge of the support plate is accommodated in the first step portion, and the side of the support plate facing the connecting flange abuts the step surface of the first step portion.

8. The heat preservation lamp for breeding as in claim 3, wherein the mounting comprises:
- at least one lamp holder, wherein said lamp holder is electrically connected at one end of the electrical connection portion away from the illumination portion; and
- at least one outer housing, wherein the outer housing has a cylindrical structure with an opening at one end and covers the outside of the lamp holder, and wherein said outer housing is connected to the lampshade.

9. The heat preservation lamp for breeding as in claim 8, wherein a portion of the second step portion is formed on the outside of the lampshade near one end of the outer housing, the portion of the second step portion being circumferentially arranged around the lampshade; the end of the outer housing having an opening is inserted into the portion of the second step portion, and the inner side surface of the outer housing abuts the step surface of the portion of the second step portion;
- and/or the material of the outer housing is aluminium, the side wall of the outer housing comprises at least one inner side plate and at least one outer side plate, and a plurality of radiating fins are connected, and the plurality of radiating fins are arranged at intervals in sequence along the circumferential direction of the outer housing.

10. The heat preservation lamp for breeding as in claim 3, wherein that there are two lampshades, wherein the two lampshades are arranged in a nested manner, and wherein one of the two lampshades is defined as an inner lampshade, and the other of the two lampshades is defined as an outer lampshade, and wherein a gap is formed between the inner side surface of the outer lampshade and the outer side surface of the inner lampshade.

11. The heat preservation lamp for breeding as in claim 3, which comprising at least one protective cover, wherein the protective cover is a net structure and covers an opening at one end of the lampshade away from the mounting part, and the protective cover and the lampshade are detachably connected.

12. The heat preservation lamp for breeding as in claim 10, further comprising at least one protective cover, wherein the protective cover is a net structure configured to cover an opening at one end of the lampshade away from the mounting part, and the protective cover and the lampshade are detachably connected.

13. The heat preservation lamp for breeding as in claim 3, further comprising at least one hanging rod, wherein the hanging rod is connected to one side of the outer housing facing away from the opening thereof, and encloses with the outer housing to form at least one hanging groove, and the hanging groove is configured to connect at least one hanging piece for mounting the heat preservation lamp for breeding in alignment; and the mounting part further comprises at least one second fastening screw, wherein the second fastening screw passes through the lamp holder and the outer housing in sequence and is configured to insert into the hanging rod so as to fix the lamp holder to the outer housing.

14. The heat preservation lamp for breeding as in claim 8, further comprising at least one hanging rod, wherein the hanging rod is connected to one side of the outer housing facing away from the opening thereof, and encloses with the outer housing to form at least one hanging groove, and the hanging groove is configured for connecting at least one hanging piece for mounting the heat preservation lamp for breeding in alignment; and the mounting part further comprises at least one second fastening screw, wherein the second fastening screw passes through the lamp holder and the outer housing in sequence and is configured to be inserted into the hanging rod so as to fix the lamp holder to the outer housing.

15. The heat preservation lamp for breeding as in claim 3, further comprising a power line, wherein one end of the power line passes through the outer housing and is electrically connected to the lamp holder.

16. The heat preservation lamp for breeding as in claim 8, further comprising a power line, wherein one end of the power line passes through the outer housing and is electrically connected to the lamp holder.

\* \* \* \* \*